US009471590B2

(12) United States Patent
Venkatesh et al.

(10) Patent No.: US 9,471,590 B2
(45) Date of Patent: Oct. 18, 2016

(54) METHOD AND APPARATUS FOR REPLICATING VIRTUAL MACHINE IMAGES USING DEDUPLICATION METADATA

(71) Applicant: Atlantis Computing, Inc., Mountain View, CA (US)

(72) Inventors: Chetan C Venkatesh, San Mateo, CA (US); Vinodh Dorairajan, San Jose, CA (US); Kartikeya Iyer, Campbell, CA (US); Vikram Auradkar, Los Altos, CA (US); Seshan Parameswaran, Sunnyvale, CA (US)

(73) Assignee: Atlantis Computing, Inc., Mountain View, CA (US)

( * ) Notice: Subject to any disclaimer, the term of this patent is extended or adjusted under 35 U.S.C. 154(b) by 0 days.

(21) Appl. No.: 13/765,689

(22) Filed: Feb. 12, 2013

(65) Prior Publication Data

US 2014/0229440 A1    Aug. 14, 2014

(51) Int. Cl.
*G06F 17/30* (2006.01)
*G06F 3/06* (2006.01)
*G06F 9/455* (2006.01)

(52) U.S. Cl.
CPC ......... *G06F 17/30174* (2013.01); *G06F 3/061* (2013.01); *G06F 3/067* (2013.01); *G06F 3/0641* (2013.01); *G06F 9/45558* (2013.01); *G06F 2009/45562* (2013.01)

(58) Field of Classification Search
CPC .......... G06F 17/30156; G06F 3/0641; G06F 17/30159; G06F 17/30097; G06F 3/065; G06F 17/30581; G06F 11/2094; G06F 3/0626; G06F 3/0683; G06F 11/1453; G06F 17/30575

USPC .......................................... 707/637, 692, 693
See application file for complete search history.

(56) References Cited

U.S. PATENT DOCUMENTS

| | | | |
|---|---|---|---|
| 4,603,380 A | 7/1986 | Easton et al. | |
| 6,675,214 B2 | 1/2004 | Stewart et al. | |
| 6,807,619 B1 | 10/2004 | Ezra et al. | |
| 6,915,302 B1 | 7/2005 | Christofferson et al. | |
| 7,269,608 B2 | 9/2007 | Wong et al. | |
| 7,356,651 B2 | 4/2008 | Liu et al. | |
| 7,571,288 B2 | 8/2009 | Pudipeddi et al. | |
| 7,908,436 B1 | 3/2011 | Srinivasan et al. | |
| 8,046,446 B1 | 10/2011 | Karr et al. | |
| 8,117,464 B1 | 2/2012 | Kogelnik | |
| 8,135,930 B1 * | 3/2012 | Mattox | G06F 9/45558 711/100 |
| 8,312,471 B2 | 11/2012 | Davis | |
| 8,442,955 B2 * | 5/2013 | Al Kiswany | G06F 17/30233 707/610 |
| 8,495,288 B2 | 7/2013 | Hosoya et al. | |

(Continued)

*Primary Examiner* — Tony Mahmoudi
*Assistant Examiner* — Merilyn Nguyen
(74) *Attorney, Agent, or Firm* — Blakely, Sokoloff, Taylor & Zafman LLP

(57) ABSTRACT

Techniques for fast provisioning of virtual machine images using deduplication metadata are described, including receiving a request to copy a first virtual machine to form a second virtual machine, identifying a first portion of memory comprising data for the first virtual machine; and forming the second virtual machine based on the first portion of memory comprising data for the first virtual machine, wherein forming the second virtual machine further comprises linking the second virtual machine to the first portion of memory comprising data for the first virtual machine, and implementing a second portion of memory to store data for the second virtual machine independent of the first virtual machine.

20 Claims, 8 Drawing Sheets

(56) References Cited

U.S. PATENT DOCUMENTS

| | | |
|---|---|---|
| 8,566,821 B2 | 10/2013 | Robinson et al. |
| 8,732,401 B2 | 5/2014 | Venkatesh et al. |
| 8,983,952 B1 * | 3/2015 | Zhang ................. G06F 7/00 707/736 |
| 9,037,547 B1 * | 5/2015 | Shivdeo ............ G06F 17/30575 707/664 |
| 9,305,007 B1 * | 4/2016 | Efstathopoulos . G06F 17/30156 |
| 2002/0124137 A1 | 9/2002 | Ulrich et al. |
| 2003/0145045 A1 | 7/2003 | Pellegrino et al. |
| 2003/0188045 A1 | 10/2003 | Jacobson |
| 2004/0111443 A1 | 6/2004 | Wong et al. |
| 2004/0128470 A1 | 7/2004 | Hetzler et al. |
| 2005/0038850 A1 | 2/2005 | Oe et al. |
| 2005/0108440 A1 | 5/2005 | Baumberger et al. |
| 2005/0114595 A1 | 5/2005 | Karr et al. |
| 2005/0131900 A1 | 6/2005 | Palliyll et al. |
| 2006/0112251 A1 | 5/2006 | Karr et al. |
| 2006/0272015 A1 | 11/2006 | Frank et al. |
| 2007/0005935 A1 | 1/2007 | Khosravi et al. |
| 2007/0192534 A1 | 8/2007 | Hwang et al. |
| 2007/0248029 A1 | 10/2007 | Merkey et al. |
| 2007/0260702 A1 | 11/2007 | Richardson et al. |
| 2007/0266037 A1 | 11/2007 | Terry et al. |
| 2008/0183986 A1 | 7/2008 | Yehia et al. |
| 2009/0063528 A1 | 3/2009 | Yueh |
| 2009/0063795 A1 | 3/2009 | Yueh |
| 2009/0089337 A1 | 4/2009 | Perlin et al. |
| 2009/0254507 A1 | 10/2009 | Hosoya et al. |
| 2009/0319772 A1 | 12/2009 | Singh et al. |
| 2010/0031000 A1 | 2/2010 | Flynn et al. |
| 2010/0064166 A1 | 3/2010 | Dubnicki et al. |
| 2010/0070725 A1 | 3/2010 | Prahlad et al. |
| 2010/0138827 A1 * | 6/2010 | Frank ................. G06F 9/45558 718/1 |
| 2010/0180153 A1 | 7/2010 | Jernigan, IV et al. |
| 2010/0181119 A1 | 7/2010 | Saigh et al. |
| 2010/0188273 A1 | 7/2010 | He et al. |
| 2010/0274772 A1 * | 10/2010 | Samuels .......... G06F 17/30233 707/693 |
| 2010/0306444 A1 | 12/2010 | Shirley et al. |
| 2010/0332401 A1 * | 12/2010 | Prahlad et al. ................. 705/80 |
| 2011/0035620 A1 | 2/2011 | Elyashev |
| 2011/0055471 A1 | 3/2011 | Thatcher et al. |
| 2011/0071989 A1 | 3/2011 | Wilson et al. |
| 2011/0082836 A1 | 4/2011 | Wang et al. |
| 2011/0131390 A1 * | 6/2011 | Srinivasan et al. ........... 711/209 |
| 2011/0145243 A1 | 6/2011 | Yudenfriend |
| 2011/0167045 A1 | 7/2011 | Okamoto |
| 2011/0196900 A1 | 8/2011 | Drobychev et al. |
| 2011/0265083 A1 | 10/2011 | Davis |
| 2011/0276781 A1 | 11/2011 | Sengupta et al. |
| 2011/0295914 A1 | 12/2011 | Mori |
| 2012/0016845 A1 | 1/2012 | Bates |
| 2012/0054445 A1 | 3/2012 | Swart et al. |
| 2012/0084262 A1 * | 4/2012 | Dwarampudi ...... G06F 11/1448 707/667 |
| 2012/0137054 A1 | 5/2012 | Sadri et al. |
| 2012/0151477 A1 | 6/2012 | Sinha et al. |
| 2012/0159115 A1 | 6/2012 | Cha et al. |
| 2012/0254131 A1 | 10/2012 | Kiswany |
| 2013/0013865 A1 | 1/2013 | Venkatesh et al. |
| 2013/0036091 A1 * | 2/2013 | Provenzano ...... G06F 17/30162 707/624 |
| 2013/0117494 A1 | 5/2013 | Hughes et al. |
| 2013/0124523 A1 | 5/2013 | Rogers et al. |
| 2013/0166831 A1 | 6/2013 | Atkisson et al. |
| 2013/0238876 A1 | 9/2013 | Fiske et al. |
| 2013/0282627 A1 | 10/2013 | Faddoul et al. |
| 2013/0283004 A1 | 10/2013 | Devine et al. |
| 2014/0074804 A1 * | 3/2014 | Colgrove .......... G06F 17/30159 707/692 |

* cited by examiner

METHOD AND APPARATUS FOR REPLICATING VIRTUAL MACHINE IMAGES USING DEDUPLICATION METADATA

CROSS-REFERENCE TO RELATED APPLICATIONS

This application is related to U.S. Nonprovisional patent application Ser. No. 13/765,687, filed Feb. 12, 2013, which is herein incorporated by reference in its entirety and for all purposes.

FIELD OF THE INVENTION

Embodiments of the invention relates generally to software, data storage, and virtualized computing and processing resources. More specifically, techniques for replicating data and/or files constituting a virtual machine, or portion thereof, using deduplication metadata are described.

BACKGROUND OF THE INVENTION

Conventional approaches to replicating virtual machine images are typically a resource-intensive. Organizations replicate virtual machine images for a variety of reasons, but one notable reason is disaster recovery. Virtual machine-based computing systems in one geographic region, such as in New York City, that can be susceptible to data loss or inability to access data due to, for example, a severe hurricane or other types of disasters. In such occasions, transferring data from the affected region to another virtual machine-based computing system in another geographic region enables an organization to continue to keep its internal processes (e.g., of a business) up and running.

However, transferring data to replicate virtual machine-based computing system can involve transferring gigabytes or terabytes of data via a variety of networks, including the Internet. Creating a replica of a virtual machine requires reading the source virtual machine image block by block and transmitting copying each block to the replicated virtual machine image. This is a relatively time-consuming operation since the data sizes of virtual machine images can take many hours to complete.

Moreover, a rapidly-growing demand of virtualized systems and machines means hundreds of thousands of virtual machines may need to be deployed at different locations. Conventional solutions of replication hundreds or thousands of virtual machines is cost prohibitive and time consuming and do not scale effectively with the relatively large number of virtual machines required for deployment, even if the underlying file system of the virtual machines is deduplicated.

For example, synchronous replication techniques require the copying of data over a variety of networks to maintain up-to-date copies of the data. Generally, synchronous replication requires data to be synchronously written to different locations contemporaneously, whereby latency is introduced due to replicating to a remote location. In particular, the latency slows operation of the principal virtual machines as data is written remote virtual machines and/or storage.

Thus, what is needed is a solution for improving the cost and efficiency of replicating images of virtual machines without the limitations of conventional techniques.

BRIEF DESCRIPTION OF THE DRAWINGS

Various embodiments of the invention are disclosed in the following detailed description and the accompanying drawings.

DETAILED DESCRIPTION

Figure 1:
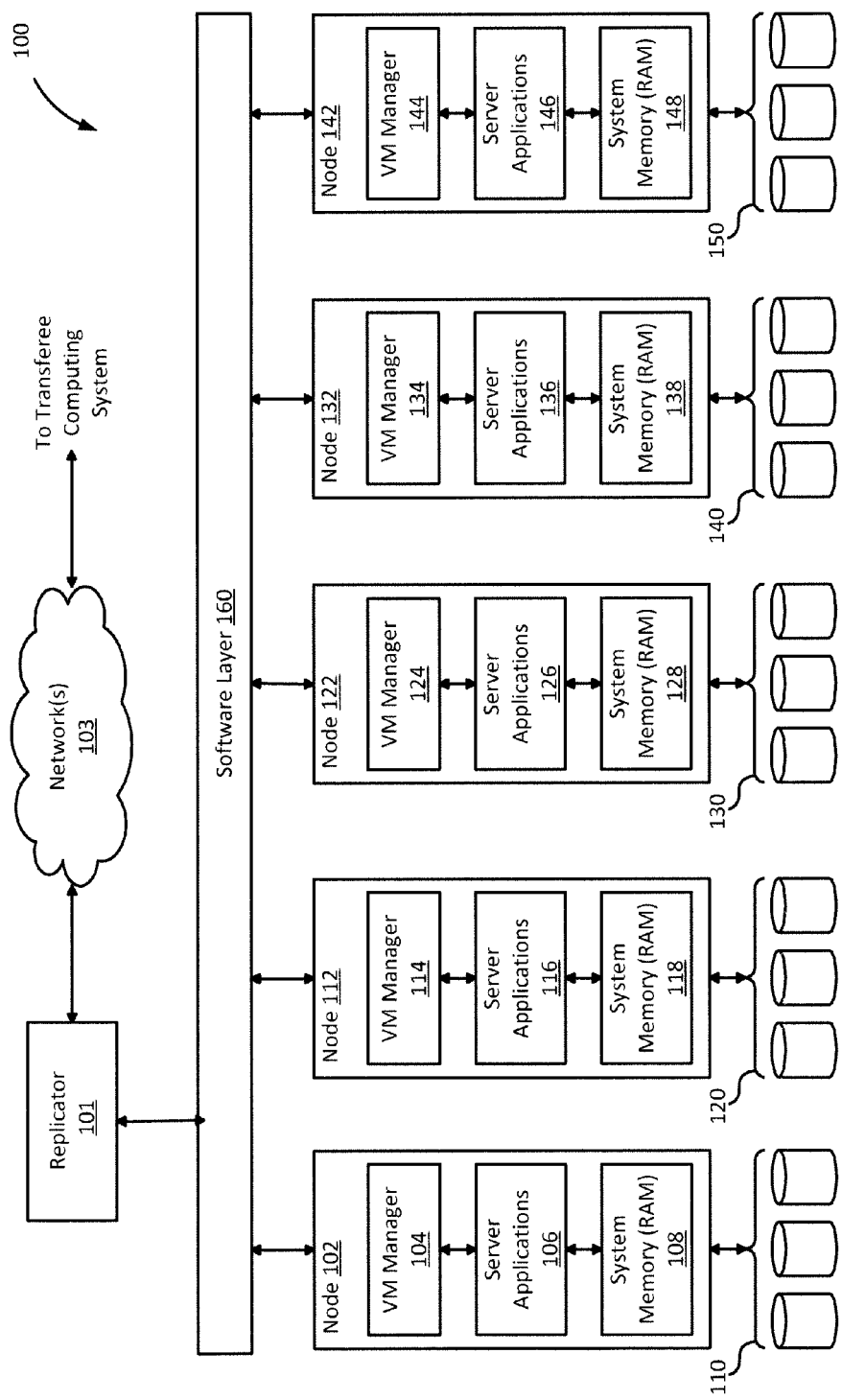
FIG. 1 illustrates an example of a virtual machine-based computing system implementing a replicator for generating replicated virtual machines in accordance with at least one embodiment.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™), Action- Script™, Flex™, Lingo™, Java™, Javascript™, Ajax, Perl, COBOL, Fortran, ADA, XML, MXML, HTML, DHTML, XHTML, HTTP, XMPP, PHP, and others. The described techniques may be varied and are not limited to the examples or descriptions provided.

As described herein, techniques for efficient replication of virtual machine images by transferring replication data and deduplication metadata using techniques described herein. The described techniques may be performed in real-time or substantially real-time in which data representing source virtual machines are used to form new virtual machines using a fast-replicate application. The fast replicating techniques described result in the formation of multiple new virtual machines that are replicated instances of a source virtual machine without, for example requiring the transferring 1 of the underlying data of the source virtual machine. Further, the described techniques can significantly reduce the amount of time required to create new virtual machines by creating the new virtual machines without transferring, for example, common data of the source virtual machine. Still further, the described techniques may reduce the amount of storage required for the new virtual machines as the replicated virtual machines need not be created by copying the files of the source virtual machine. In some examples, the described virtual machine replicating techniques may also improve scalability of virtualized networks by significantly shortening the time required to establish larger numbers of virtual machines at different locations, such as different geographic regions. Additionally, the described virtual machine replicating techniques can also be used to create new virtual machines in system memory, such as RAM, where data can be accessed quickly.

FIG. 1 illustrates an example of a virtual machine-based computing system implementing a replicator for generating replicated virtual machines in accordance with at least one embodiment. System 100 can represent any number of processors and/or computer-readable media devices (including executable instructions) that constitutes a system of virtual machines. To illustrate the structure and/or functionality of a replicator 101, virtual machines described in at least one embodiment are formed in associations of nodes 102 to 142 of a computing cluster in which multiple physical servers operate as, for example, a single computing system. The servers can be viewed as a resource pool of processors, RAM, and other computer components for providing nodes 102 to 142 to implement virtual machines. In some embodiments, nodes 102 to 142 operate as a fault tolerant high-availability ("HA") cluster in which server processors and applications are configured to reduce or eliminate downtime by, for example, providing redundant computing resources (e.g., redundant nodes) that activate upon detecting a node failure. HA clusters provide uninterrupted access to data, even if a server loses network or storage connectivity, or fails completely, or if an application running on the server fails.

In this example, system 100 includes a replicator 101, a software layer 160, and any number of nodes 102 to 142 coupled to storage devices 110 to 150, respectively. Each node can include a virtual machine ("VM") manager, one or more server applications, and system memory, such as RAM. FIG. 1 depicts nodes 102 to 142 respectively including VM managers 104 to 144, server applications 106 to 146, and system memories 108 to 148, respectively. Local storage devices 110 to 150 are coupled to nodes 102 to 142, respectively, and can include any memory or storage media, such as solid state disks (SSDs), RAM drives (or RAM disks), mechanical disk drives, etc. A software layer 160 includes executable instructions that operate as, for example, a storage virtual appliance configured to cluster virtual machine managers 104 to 144, which can include processors operating hypervisor hosts. In some embodiments, software layer 160 or portions thereof can be disposed in virtual machine managers 104 to 144. In the cluster including nodes 102 to 142, local storage devices 110 to 150 are configured to operate as shared storage. In some embodiments, local storage devices 110 to 150 (or any memory for the cluster) can implement a clustered file system, such as a block-based clustered file system, whereby a file system is distributed over a number of nodes 102 to 142 or physical servers. Client computers view the clustered file system as a single file system. Further to the example shown, nodes 102 to 142 are configured to transfer and store data at a block level.

Replicator 101 is configured facilitate efficient replication of virtual machine data from one or more nodes 102-142 of the cluster by transferring a subset of data constituting virtual machine data via one or more networks 103 to a transferee computing system (not shown), such as remote storage media devices or as a remote cluster of nodes similar to nodes 102-142. Replicator 101 can be configured to filter out or otherwise block transfer of non-essential data blocks, according to some embodiments. For example, non-essential data blocks can include redundant blocks or duplicate blocks that can reside on a replica node in the transferee computing system. Further, replicator 101 is configured to facilitate expeditious replication, especially due to a higher replication factor that is set to enhance a cluster's fault tolerance. A replication factor is a number of replica copies required in other nodes (e.g., other nodes in the cluster), which is to be transferred to the transferee computing system to maintain replicated virtual machine data.

In some embodiments, VM managers 104 to 144 include a deduplication application that can be configured to eliminate duplicate copies of repeating data to effect a form of data compression to maximize storage in one or more types of storage media (e.g., storage devices 110 to 150, non-volatile memory, and volatile memory). In a deduplication-based file system, a deduplication application can identify and eliminate duplicate copies of repeating data and implement a reference link to point to the original data, thereby eliminating duplicate data, according to some embodiments. For example, the deduplication application can store data representing a link (e.g., the reference link) associating the eliminated duplicate data and the original data in the form of deduplication metadata, which functions to describe the relationship between the original data and the deduplicated data. Examples of techniques associated with deduplication of virtual machine files are described in co-pending U.S. patent application Ser. No. 13/269,525, filed Oct. 7, 2011, entitled "Deduplication of Virtual Machine Files in a Virtualized Desktop Environment," which is incorporated herein by reference in its entirety for all purposes.

In some embodiments, a deduplication application can store the deduplication metadata in a metadata file or table used to describe or map the relationships between the deduplicated data and the original data. For example, a metadata file or table can contain data representing a block number that is associated with the physical location or data block of the data in a storage device in a deduplicated file system. Such a data block can contain data representing information such as a block number, data associated with a hash value generated by a hashing function (e.g., SHA-1 or MD5) that uniquely identifies the data in the data block, and data associated with a reference link counter to track the number of times a reference link associated with the data block is implemented.

Replicator 101 can be implemented a distinct computing device, as shown, or can be disposed or distributed in one or more nodes 102 to 142. Replicator 101 can include structures and/or functions that can be implemented in software, hardware, firmware, circuitry, or any combination thereof. As depicted in FIG. 1 and subsequent figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in FIG. 1 (or any subsequent figure) can represent one or more algorithms. Or, at least one of the elements can represent a portion of logic including a portion of hardware configured to provide constituent structures and/or functionalities.

For example, replicator 101 and any of its one or more components can include one or more processors configured to execute one or more algorithms in memory. Thus, at least some of the elements in FIG. 1 (or any subsequent figure) can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit. For example, replicator 101 and any of its one or more components can be implemented in one or more computing devices that include one or more circuits. Thus, at least one of the elements in FIG. 1 (or any subsequent figure) can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Figures 2A, 2B:
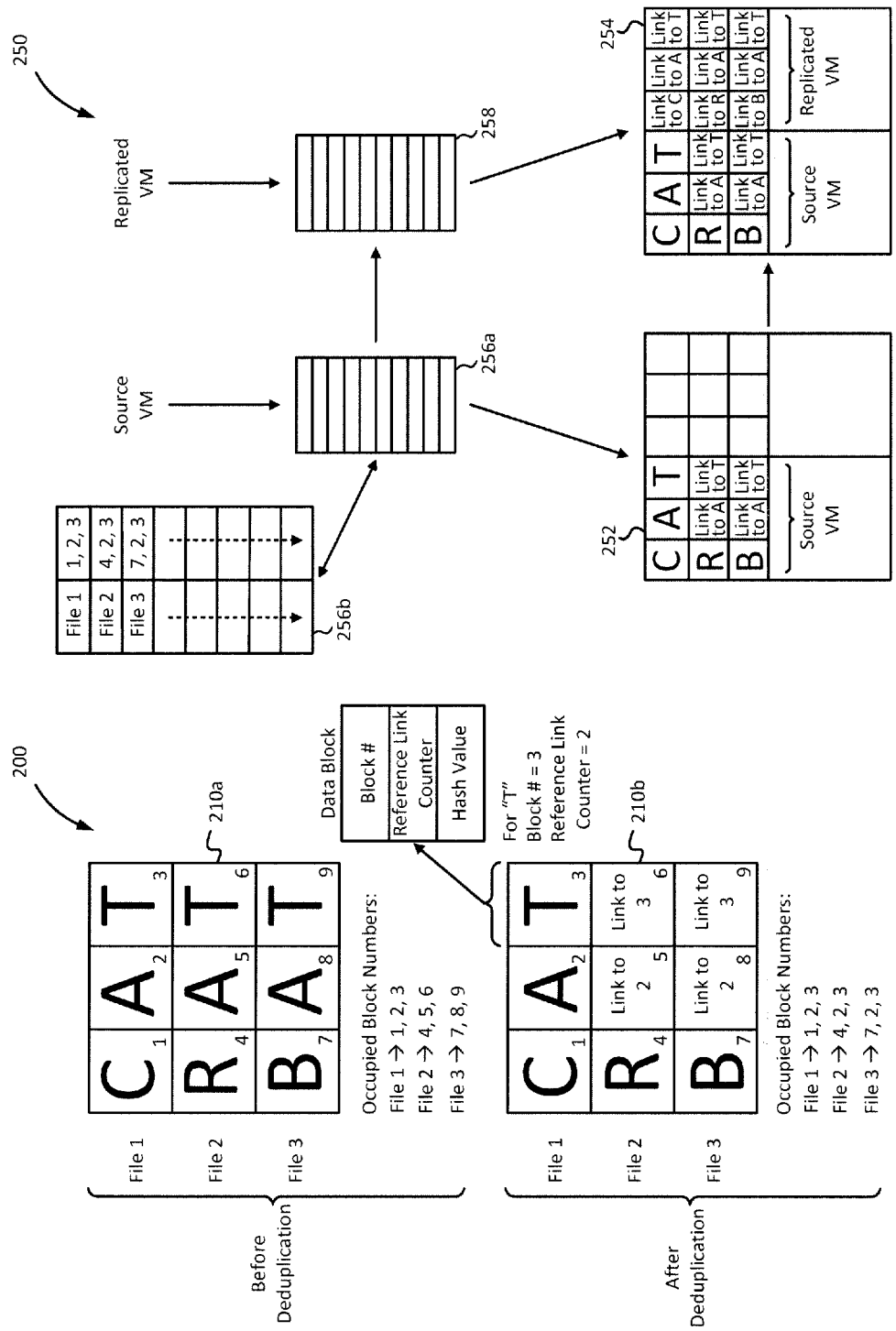
FIG. 2A illustrates a graphical representation of an example of deduplicating a virtual machine image to form deduplicated virtual machine data, according to some embodiments.
FIG. 2B illustrates a graphical representation of an example of implementing a source virtual machine to form a replicated virtual machine, according to some embodiments.

FIG. 2A illustrates a graphical representation of an example of deduplicating a virtual machine image to form deduplicated virtual machine data, according to some embodiments. Data block 210b is a graphical representation of an example of data block 210a after deduplication. In some embodiments, a deduplication process can remove redundant or duplicate copies of data chunks. For example, deduplication removes duplicate copies of data chunk "A" (in data blocks 5 and 8 in data block 210a) and implements a reference link (e.g., an association with a block number or an association with a location of a data block) associating the redundant or duplicate copies of data chunk "A" to the original data chunk "A" (in data block 2) and stores data representing the linking information in a deduplication metadata file, such as deduplication metadata file 256b described below in FIG. 2B. In some embodiments, the data blocks of a deduplicated file system may contain data representing information such as the block number, data associated with a hash value generated by a hashing function that uniquely identifies the data chunk in the data block, and data associated with a reference link counter to track the number of times a reference link is implemented to associate removed redundant data with the data block. For example, block 3 of data block 210b may contain data representing information describing the block number as "3," can include data that represents a hash value for data chunk "T," and data associated with a reference link count of two because two duplicate copies of data chunk "T" have been removed and linked to this original data chunk "T."

FIG. 2B illustrates a graphical representation of an example of implementing a source virtual machine to form a replicated virtual machine, according to some embodiments. Diagram 250 depicts an example of replicating a source virtual machine to form a virtual machine using the deduplication metadata of the source virtual machine. In some embodiments, deduplication metadata file 256b can be configured to include data representing a list of files and reference links (e.g., associations with block numbers or associations with locations of data blocks) to the data blocks where the data of the files are stored. In some implementations, if a file system is deduplication-based, some files may share data blocks with other files and result in multiple links to the same data block. For example, deduplication metadata file 256b can include data representing a list of virtual machine data files and their respective links (e.g., in the form of block numbers) to data blocks that store the data of the deduplicated virtual machine files. In some embodiments, if a file system is deduplication-based, duplicate instances of a file can be created without making a copy of the file itself. For example, replicated instances of a file can be made by duplicating the deduplication metadata and the reference links of the file, and updating the number of times the data block (or blocks) of the file has been linked (a link to each data block of the file has been created for each new instance of a file). In some embodiments, updating the number of times the data block of a file has been linked could also be referred to as updating a reference link counter associated with the data block.

In some embodiments, duplicate instances of an entire virtual machine image can be formed or created by duplicating the deduplication metadata files associated with the virtual machine and without copying any data portions of the virtual machine itself. For example, to create a replicated virtual machine (or a replicated instance of a source virtual machine), deduplication metadata table 256a, which includes links to the data blocks where the source virtual machine data is stored, is duplicated to form deduplication metadata table 258, which includes new links to the data blocks where the source virtual machine data is stored (254). After an instance of the source virtual machine is formed, a reference link counter for each of the data blocks of the data of the source virtual machine is incremented a replicator 101 of FIG. 1 each time a new reference link to the data block is implemented to track the number of times removed redundant data is associated with the data block. In some implementations, the above-described technique for creating replicated instances of virtual machines from a source virtual machine may be referred to as fast replicating.

Figure 3:
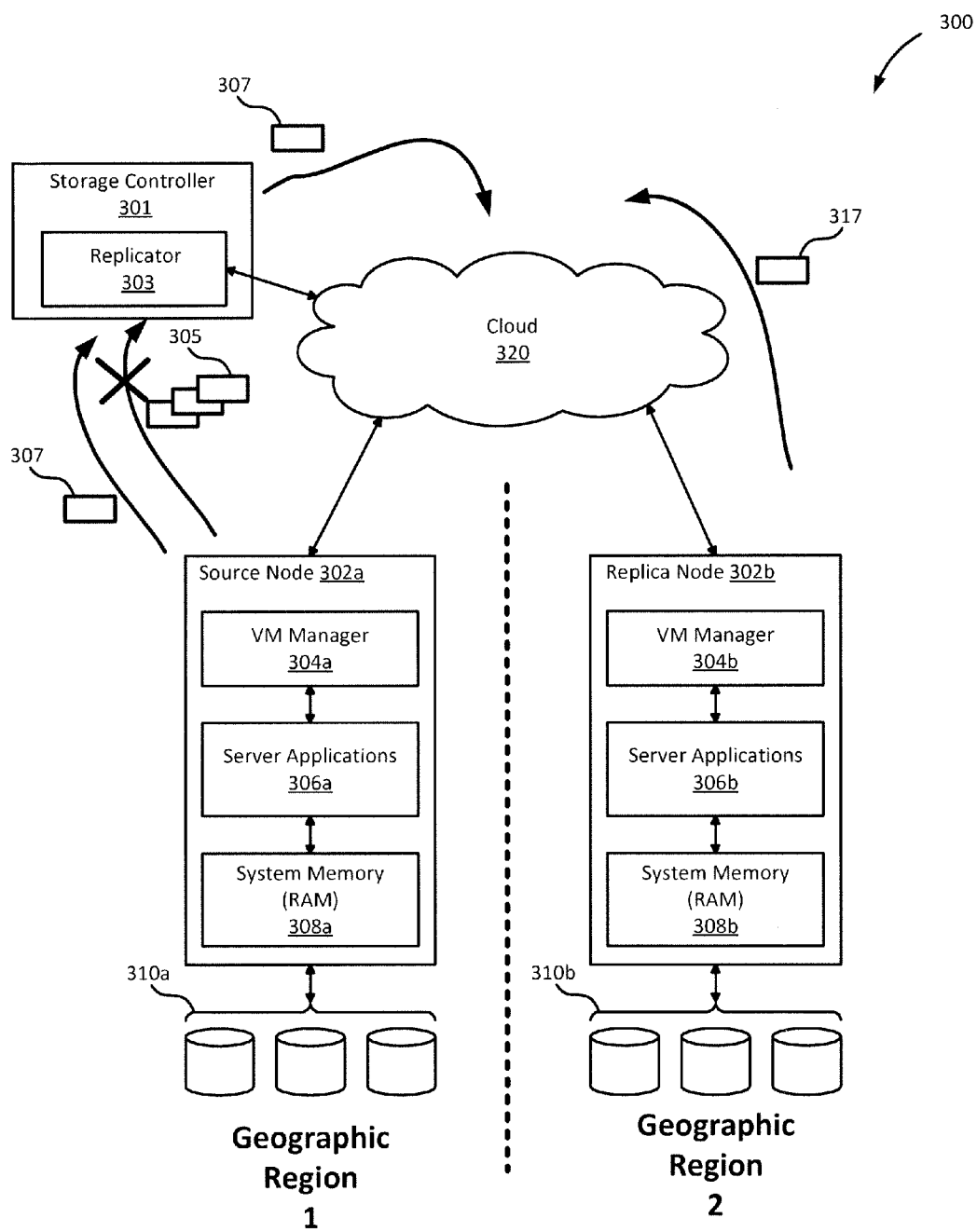
FIG. 3 illustrates an example of a replicator to replicating virtual machines (VMs) associated with data representing a source virtual machine in accordance with at least one embodiment.

FIG. 3 illustrates an example of a replicator to replicating virtual machines (VMs) associated with data representing a source virtual machine in accordance with at least one embodiment. As shown in diagram 300, a replicator 303 is disposed in a storage controller 301 and is configured to generate replication data that is configured to transfer replicated data to reduce, minimize, and/or eliminate latencies otherwise caused by replicating data, for example, in accordance with synchronous replication techniques. In the example shown, replicator is configured to generate a replica node 302b based on deduplicated data associated with source node 302a. As shown, replica node 302b includes a VM manager 304b, one or more server applications 306b, and system memory 308b disposed at a first location, and source node 302b includes a VM manager 304a, one or more server applications 306a, and system memory 308a disposed at a second location. Replicator 303 is configured to determine common data among source node 302a and replica node 302b, and generates replication data 307 for transfer from source node 302a to replica node 302b. Replication data 307, for example, includes data for updating replica node 302b to match data associated with source node 302. Thus, replicator 303 filters out or avoids transfer of common data 305 that shared among source node 302a and replica node 302b. Acknowledgment data 317 is sent back to source node 302a to affirm that replica node 302b is updated as a replication of source node 302a. As less than all of the data associated with source node 302a is used, acknowledgement data 317 is received after replication data 307 is sent in reduced duration than otherwise might be the case. Replica node 302b can be a mirrored backup of source node 302a, according to some examples.

Figure 4:
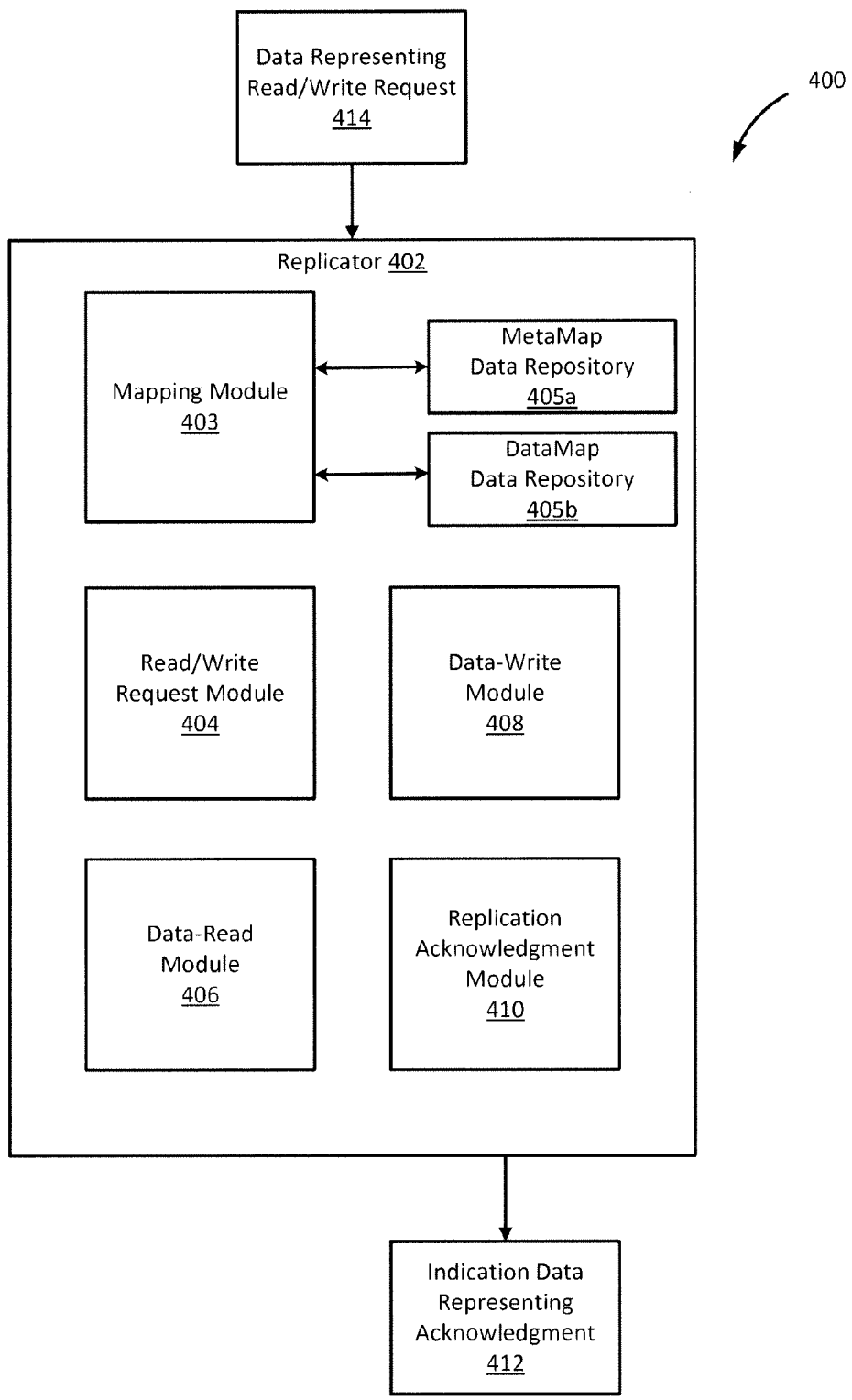
FIG. 4 illustrates an example of a replicator application module according to some embodiments.

FIG. 4 illustrates an example of a replicator application module according to some embodiments. A replicator module 402 is configured to receive data representing a read/write request 414, and includes a mapping module 403, a metamap data repository 405a, a datamap data repository 405b, a read/write request module 404, a data-read module 406, a data-write module 408, and a replication acknowledgment module 410 configured to generate data representing an indication 412 acknowledging successful replication at a replica node. Mapping module 403 is configured to generate metamap data for storing in metamap data repository 405a, and is further configured to generate datamap data for storing in datamap data repository 405b. According to some embodiments, metamap data is metadata that is arranged in a hash table consisting of keys mapped to values, a key includes data representing a node ID and a logical block number ("LBN") of a data block. A node ID a unique identifier of a specific node in a cluster. Further, the values to which the keys are mapped include unique value to identify a data block and/or data therein. For example, the values can be a hash value. According to some embodiments, datamap data is metadata that is arranged in a hash table consisting of other keys mapped to other values. One of the other keys includes data representing a unique value, such as a hash value, to identify a data block and/or data therein. Further, the other values to which the other keys are mapped include the data block and/or data therein. Initially, mapping module 403 is configured to initialize metamap and datamap data to zeros (e.g., when the file system is formatted and freshly installed).

Read/write request module 404 is configured to detect a request to access data in a local storage device (e.g., a hypervisor datastore), whereby data blocks are written to, or read from, the local storage device. Thus, read/write request module 404 can be configured to identify data representing a first file on a first storage device during a write operation. The data can include metadata for deduplicated data. Data-read module 406 is configured to detect read operations and associated data from the local storage device. The data block can be retrieved by looking up a local node's MetaMap data in metamap data repository 405a with a key set to a logical block number ("LBN") of the data block to obtain a corresponding hash value. With the hash value as a key, a look-up operation can be performed in the DataMap data in datamap data repository 405b to retrieve the actual data.

Data-write module 408 is configured to determine whether the data representing a first file matches a set of data on a second storage device. For example, data-write module 408 is configured to compute hash value of a data block to be written to the local storage device. Further, data-write module 408 is configured to transmit hash to the replica node along with a local node ID and a logical block number ("LBN") of data on disk.

Replication acknowledgment module 410 can be configured to check on the replica node to determine if the same hash block exists on remote storage device, which is local to the replica node. Replication acknowledgment module 410 can be configured to form a second file on the second storage device by, for example, linking the second file to the set of data on the second storage device if the data representing the first file matches the set of data on the second storage device, and copying the data representing the first file to form the second file if the data representing the first file does not match the set of data on the second storage device. If the replica node includes the data, then an entry is made in the replica node's MetaMap and replicator 402 is informed of successful replication. As such, there is no need to send the actual data block across "the wire," or over the networks. The source node's MetaMap also gets updated pointing to remote node for that data block. But if the replica node does not include the data, then the data block is sent to the replica node, along with its hash value, logical block number ("LBN"), node ID, and entries are made in the repositories for MetaMap and DataMap data in replicator 402.

Figure 5:
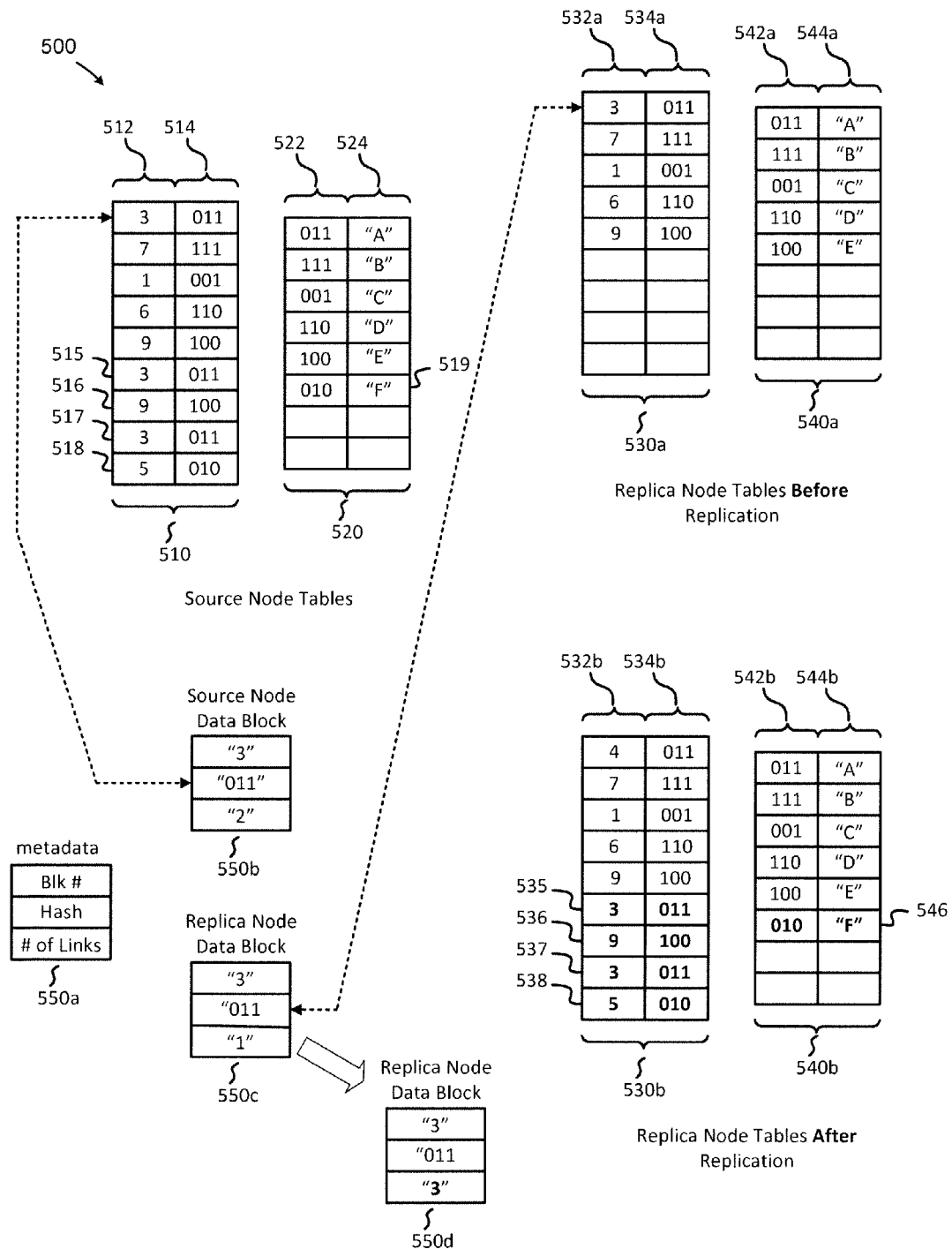
FIG. 5 depicts data arrangements implemented by a VM replication process, according to some embodiments.

FIG. 5 depicts data arrangements implemented by a VM replication process, according to some embodiments. Diagram 500 depicts examples of source node tables 510 and 520 and replica node tables 530a, 530b, 540a, and 540b, according to some embodiments. Metadata 550a includes data representing a logical block number ("blk #"), a hash value ("hash"), and a number of links ("# of links") indicating the number of instances the copies of the data link back to the source data. The source node tables include a metamap table 510 and a datamap table 520. Metamap table 510 includes block numbers 512 and corresponding hash values 514, whereas datamap table 520 includes hash values 522 and data 524 for blocks of data.

To illustrate operation of a replicator of various embodiments, consider that data is written into a local storage device in a first time interval. That is, data is written as data 515, 516, 517, and 518 into metamap table 510, and data 519 is written into datamap table 520 (e.g., F represents a block of data). At this time, metadata 550b for data block "A" in 524, which is associated with key 522, indicates that there are "three" instances of "A" in the source node (e.g., an original data block with "A" and two links to that original data block).

A request to initiate a replication operation occurs in a second time interval in which the replica node includes data—prior to replication—in replica node tables 530a and 540a. In particular, metamap table 530a includes initial data for block numbers 532a and corresponding hash values 534a prior to replication. Datamap table 540a includes initial data hash values 542a and data 544a for blocks of data prior to replication. At this time, the metadata 550c for data block "A" in 544a, which is associated with key 542a, indicates that there is "one" instance of "A" in the replica node (i.e., the data of the original data block with "A").

Next, in a third time interval, data associated with data block "F" is written to the replica node. That is, data block "F" is written into datamap table 540b as data 544b, which is associated with hash value 542b, after replication. Further, during replication, data 535, 536, 537, and 538 is written into metamap table 530b. Thereafter, metadata for data block "A" has a value of "three" links, as depicted in metadata 550d.

Figure 6:
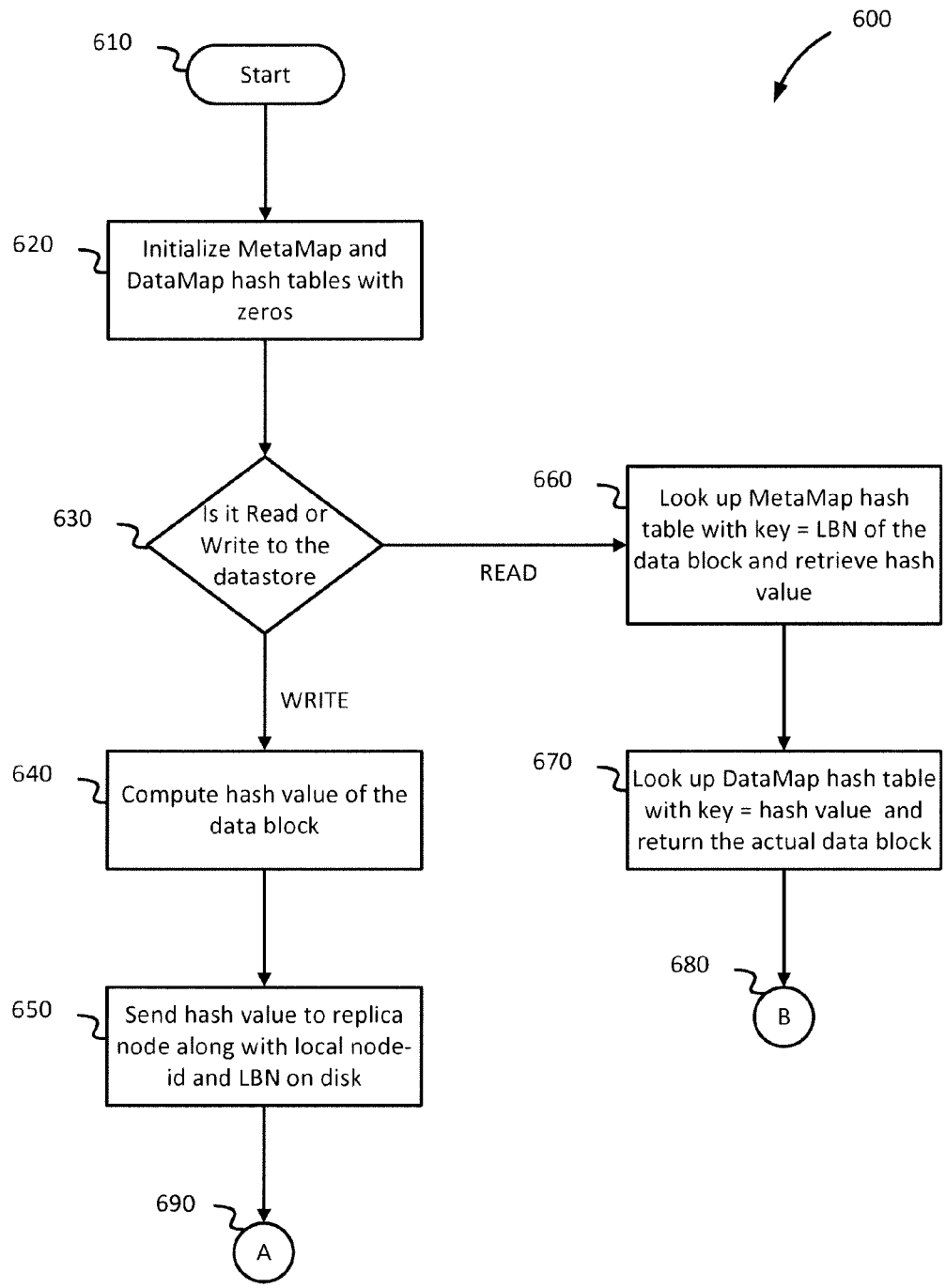
FIG. 6 is a flow diagram of an example of a first portion of a replication process using deduplicated data for virtual machine images, according to some embodiments.

FIG. 6 is a flow diagram of an example of a first portion of a replication process using deduplicated data for virtual machine images, according to some embodiments. At 610, replication starts in flow diagram 600. At 620, the metamap and datamap tables are initialized with zeros. At 630, a determination is made whether an access to a local data store is a read or a write. If the access operation is a read operation, flow 600 moves to 660 at which a look-up operation is performed on a metamap hash table using data representing a key of a logical block number of the data block, whereby a hash value (e.g., an MD5 hash value) is retrieved. At 670, a look-up operation is performed on a datamap hash table with a key (e.g., a hash value, such as a MD5 value) to return with an actual data block. From there, flow 600 moves to 680, which continues in FIG. 7. But if the access operation is a write operation, flow 600 moves to 640 to compute a hash value (e.g., a MD5 hash value) of the data block. The hash value is sent to the replica node at 650 along with local node ID data and LBN data on disk. Thereafter, flow 600 moves to 690, which continues in FIG. 7

Figure 7:
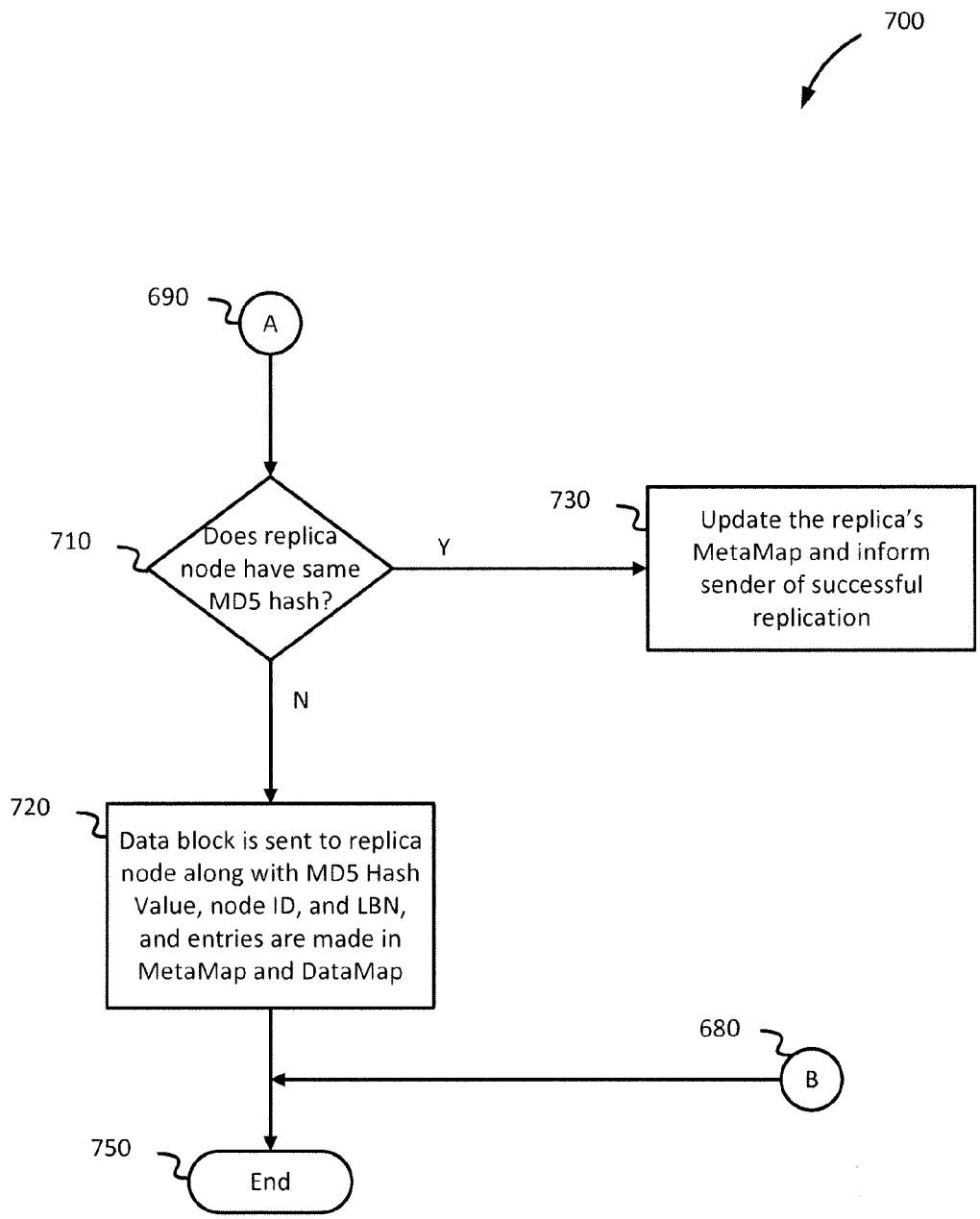
FIG. 7 is a flow diagram of an example of a second portion of the replication process using deduplicated data for virtual machine images, according to some embodiments.

FIG. 7 is a flow diagram of an example of a second portion of the replication process using deduplicated data for virtual machine images, according to some embodiments. If there was a write operation, flow 700 continues at 680 from FIG. 6. At 710, a determination is made whether the replica node has the same MD5 hash value. If equivalent data exists at the replica node, flow 700 updates the replica's MetaMap and transmits to source node (e.g., the sender) an acknowledgement of successful replication at 730. Otherwise, if equivalent data does not exist, flow 700 moves to 720 at which a data block is sent to replica node along with a corresponding MD5 hash Value, node ID, and LBN. Then, entries are made in the metamap and datamap tables. Flow 700 terminates at 750.

Figure 8:
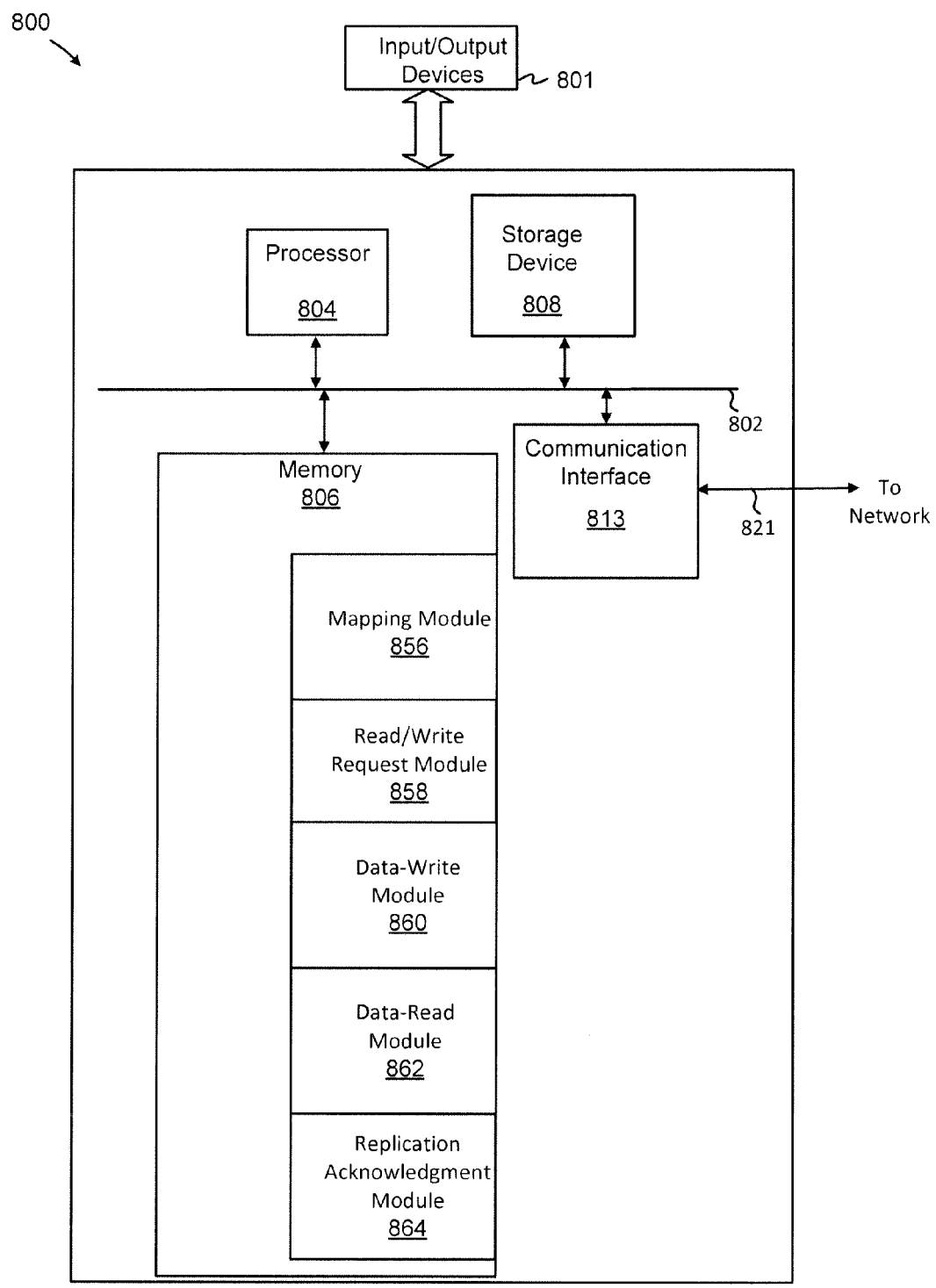
FIG. 8 illustrates an example of a computing platform to fast replicate a source virtual machine in accordance with various embodiments.

FIG. 8 illustrates an example of a computing platform to fast replicate a source virtual machine in accordance with various embodiments. In some examples, computing platform 800 may be used to implement computer programs, applications, methods, processes, algorithms, or other software to perform the above-described techniques. Computing platform 800 includes a bus 802 or other communication mechanism for communicating information, which interconnects subsystems and devices, such as processor 804, system memory 806 (e.g., RAM, etc.), storage device 808 (e.g., ROM, etc.), a communication interface 813 (e.g., an Ethernet or wireless controller, a Bluetooth controller, etc.) to facilitate communications via a port on communication link 821 to communicate, for example, with a computing device, including mobile computing and/or communication devices with processors. Processor 804 can be implemented with one or more central processing units ("CPUs"), such as those manufactured by Intel® Corporation, or one or more virtual processors, as well as any combination of CPUs and virtual processors. Computing platform 800 exchanges data representing inputs and outputs via input-and-output devices 801, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 800 performs specific operations by processor 804 executing one or more sequences of one or more instructions stored in system memory 806, and computing platform 800 can be implemented in a client-server arrangement, peer-to-peer arrangement, or as any mobile computing device, including smart phones and the like. Such instructions or data may be read into system memory 806 from another computer readable medium, such as storage device 808. In some examples, hard-wired circuitry may be used in place of or in combination with software instructions for implementation. Instructions may be embedded in software or firmware. The term "computer readable medium" refers to any tangible medium that participates in providing instructions to processor 804 for execution. Such a medium may take many forms, including but not limited to, non-volatile media and volatile media. Non-volatile media includes, for example, optical or magnetic disks and the like. Volatile media includes dynamic memory, such as system memory 806.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 802 for transmitting a computer data signal.

In some examples, execution of the sequences of instructions may be performed by computing platform 800. According to some examples, computing platform 800 can be coupled by communication link 821 (e.g., a wired network, such as LAN, PSTN, or any wireless network) to any other processor to perform the sequence of instructions in coordination with (or asynchronous to) one another. Computing platform 800 may transmit and receive messages, data, and instructions, including program code (e.g., application code) through communication link 821 and communication interface 813. Received program code may be executed by processor 804 as it is received, and/or stored in memory 806 or other non-volatile storage for later execution.

In the example shown, system memory 806 can include various modules that include executable instructions to implement functionalities described herein. In the example shown, system memory 806 includes a mapping module 856, a read/write replicate request module 858, a data-write module 860, a data-read module 862, and a replication acknowledgment module 862, any of which can be configured to provide one or more functions described herein.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method, comprising:
   identifying data representing a first instance of a virtual machine image on a first storage device to be replicated to a second storage device;
   copying a deduplication metadata file that describes the first instance of the virtual machine image from the first storage device to the second storage device, wherein the deduplication metadata file comprises a list of one or more virtual machine image data files for the first instance of the virtual machine image and associated reference links to data blocks of the one or more virtual machine image data files;
   determining, based on metadata describing the data blocks of the one or more virtual machine image data files in the deduplication metadata file, which data representing the first instance of the virtual machine image matches data from a set of data on the second storage device;
   forming a second instance of the virtual machine image on the second storage device based on the metadata description in the deduplication metadata file to replicate the first instance of the virtual machine image at the second storage device, wherein forming the second instance of the virtual machine image on the second storage device further comprises:
   linking the second instance of the virtual machine image to at least a portion of the set of data on the second storage device for data representing the first instance of the virtual machine image that matches data from the set of data on the second storage device to form the second instance of the virtual machine image without transferring underlying blocks of data for the one or more virtual machine image data files from the first storage device to the second storage device.

2. The method of claim 1, wherein identifying data representing the first instance of the virtual machine image on the first storage device further comprises:
   determining a block number associated with the first instance of the virtual machine image on the first storage device;
   determining a hash value associated with the first instance of the virtual machine image based on the block number; and
   determining the data representing the first instance of the virtual machine image on the first storage device based on the hash value.

3. The method of claim 1, wherein linking the second instance of the virtual machine image to the set of data on the second storage device further comprises:
   updating a metadata file on the second storage device to include metadata associated with the second instance of the virtual machine image.

4. The method of claim 3, wherein metadata in the metadata file is associated with deduplicated data.

5. The method of claim 3, wherein the metadata file on the second storage device comprises a link counter associated with the set of data on the second storage device.

6. The method of claim 5, wherein the link counter associated with the set of data on the second storage device indicates a number of times the set of data on the second storage device is linked.

7. The method of claim 1, wherein determining whether the data representing the first instance of the virtual machine image matches a set of data on a second storage device further comprises:
   determining a block number associated with the first instance of the virtual machine image on the first storage device;
   determining a first hash value associated with the first instance of the virtual machine image based on the block number;
   determining a second hash value associated with the set of data on the second storage device; and
   determining whether the first hash value matches the second hash value.

8. The method of claim 1, wherein the first storage device is coupled to a first node of a computer cluster.

9. The method of claim 8, wherein the second storage device is coupled to a second node of the computer cluster, wherein the computer cluster comprises a virtual storage appliance that aggregates storage of data using the first node and the second node, and the second node is a mirrored backup of the first node, and wherein the second instance of the virtual machine image is formed on the second node based on the deduplication data within the aggregated storage without copying the one or more virtual machine image data files listed in the deduplication metadata file.

10. The method of claim 9, wherein the first node and second node are coupled via a cloud network.

11. A system, comprising:
a first storage device configured to store data representing a first instance of a virtual machine image;
a processor configured to
copy a deduplication metadata file that describes the first instance of the virtual machine image from the first storage device to a second storage device, wherein the deduplication metadata file comprises a list of one or more virtual machine image data files for the first instance of the virtual machine image and associated reference links to data blocks of the one or more virtual machine image data files,
determine, based on metadata describing the data blocks of the one or more virtual machine image data files in the deduplication metadata file, which data representing the first instance of the virtual machine image matches data from a set of data on the second storage device, and
form a second instance of a virtual machine image on the second storage device based on the metadata description in the deduplication metadata file to replicate the first instance of a virtual machine image at the second storage device, the processor being further configured,
link the second instance of a virtual machine image to at least a portion of the set of data on the second storage device for data representing the first instance of a virtual machine image that matches data from the set of data on the second storage device,
to form the second instance of a virtual machine image without transferring underlying blocks of data for the one or more virtual machine image data files from the first storage device to the second storage device.

12. The system of claim 11, wherein the processor is further configured to determine a block number associated with the first instance of a virtual machine image on the first storage device, to determine a hash value associated with the first instance of a virtual machine image based on the block number, and to determine the data representing the first instance of a virtual machine image on the first storage device based on the hash value.

13. The system of claim 11, wherein the processor is further configured to update a metadata file on the second storage device to include metadata associated with the second instance of a virtual machine image.

14. The system of claim 13, wherein metadata in the metadata file is associated with deduplicated data.

15. The system of claim 13, wherein the metadata file on the second storage device comprises a link counter associated with the set of data on the second storage device.

16. The system of claim 15, wherein the link counter associated with the set of data on the second storage device indicates a number of times the set of data on the second storage device is linked.

17. The system of claim 11, wherein the processor is further configured to determine a block number associated with the first instance of a virtual machine image on the first storage device, to determine a first hash value associated with the first instance of a virtual machine image based on the block number, to determine a second hash value associated with the set of data on the second storage device, and to determine whether the first hash value matches the second hash value.

18. The system of claim 11, wherein the first storage device is coupled to a first node of a computer cluster.

19. The system of claim 18, wherein the second storage device is coupled to a second node of the computer cluster, wherein the computer cluster comprises a virtual storage appliance that aggregates storage of data using the first node and the second node, and the second node is a mirrored backup of the first node, and wherein the second instance of the virtual machine is formed on the second node based on the deduplication data within the aggregated storage without copying the one or more virtual machine data files listed in the deduplication metadata file.

20. A method, comprising:
identifying data representing a first instance of a virtual machine image on a first storage device to be replicated to a second storage device;
copying a deduplication metadata file that describes the first instance of the virtual machine image from the first node to the second node, wherein the deduplication metadata file comprises a list of one or more virtual machine image data files for the first instance of the virtual machine image and associated reference links to data blocks of the one or more virtual machine image data files;
determining which data representing the first instance of the virtual machine image matches data from a set of data on the second storage device, wherein determining which data representing the first instance of a virtual machine image matches data from the set of data on the second storage device further comprises:
determining a block number associated with the first instance of the virtual machine image on the first storage device;
determining a hash value associated with the first instance of the virtual machine image based on the block number;
determining the data representing the first instance of the virtual machine image on the first storage device matches data from the set of data on the second storage device based on the hash value;
forming a second instance of the virtual machine image on the second storage device to replicate the first instance of the virtual machine image at the second storage device, wherein forming the second instance of the virtual machine image on the second storage device further comprises:
linking the second instance of the virtual machine image to at least a portion of the set of data on the second storage device for data representing the first instance of the virtual machine image that matches data from the set of data on the second storage device
to form the second instance of the virtual machine image without transferring underlying blocks of data for the one or more virtual machine data files from the first storage device to the second storage device.

* * * * *